(12) United States Patent
Nakajima et al.

(10) Patent No.: US 7,120,310 B2
(45) Date of Patent: Oct. 10, 2006

(54) IMAGE NOISE REDUCTION METHOD AND DEVICE

(75) Inventors: Ken Nakajima, Tokyo (JP); Satoshi Mitsui, Aichi (JP)

(73) Assignee: Sony Corporation, Tokyo (JP)

( * ) Notice: Subject to any disclaimer, the term of this patent is extended or adjusted under 35 U.S.C. 154(b) by 566 days.

(21) Appl. No.: 10/276,110

(22) PCT Filed: Feb. 20, 2002

(86) PCT No.: PCT/JP02/01476

§ 371 (c)(1),
(2), (4) Date: Jul. 18, 2003

(87) PCT Pub. No.: WO02/069263

PCT Pub. Date: Sep. 6, 2002

(65) Prior Publication Data

US 2004/0008902 A1 Jan. 15, 2004

(30) Foreign Application Priority Data

Feb. 26, 2001 (JP) .............................. 2001-50909

(51) Int. Cl.
*G06K 9/40* (2006.01)
*H04L 27/22* (2006.01)

(52) U.S. Cl. .................................................. 382/275

(58) Field of Classification Search ........ 382/260–264, 382/254, 270, 275, 284; 358/3.26
See application file for complete search history.

(56) References Cited

U.S. PATENT DOCUMENTS

| 4,463,375 | A | * | 7/1984 | Macovski ................. 378/98.12 |
| 5,715,335 | A | * | 2/1998 | De Haan et al. ............ 382/265 |
| 5,771,318 | A | * | 6/1998 | Fang et al. ................ 382/261 |
| 5,778,107 | A | * | 7/1998 | Kataoka .................... 382/291 |
| 5,832,115 | A |   | 11/1998 | Rosenberg |

(Continued)

FOREIGN PATENT DOCUMENTS

EP    1 061 734 A2    12/2000

(Continued)

OTHER PUBLICATIONS

Jacquin A et al: "Content-adaptive postfiltering for very low bit rate video" Data Compression Conference, 1997. DCC' 97. Proceedings Snowbird, UT, USA Mar. 25-27, 1997, Los Alamitos, CA, USA, IEEE Comput. Soc, US, Mar. 25, 1997, pp. 111-120, XP010218725.

(Continued)

*Primary Examiner*—Kanjibhai Patel
(74) *Attorney, Agent, or Firm*—Frommer Lawrence & Haug LLP; William S. Frommer; Thomas F. Presson

(57) ABSTRACT

An image noise reduction method and apparatus to be used to digitize and process an image signal. Level values of peripheral pixels and the level value of a watched pixel are input into eight comparators and the value "1" is output when absolute values of differences between the level values are smaller than the value of a reference level. Signals output from the comparators are supplied to four AND circuits. The signals output from the AND circuits are supplied to eight AND gates in accordance with each combination and level values of corresponding peripheral pixels. Signals output from the AND circuits are supplied to an adder and the value "1" is added to the multiplication value and output to an output port-4. Thereby, the averaging operation is performed by using only pixels which solves the problem that an averaged signal phase is deviated from an original position.

10 Claims, 6 Drawing Sheets

U.S. PATENT DOCUMENTS 6,347,161 B1 * 2/2002 Mancuso .................... 382/261
6,980,696 B1 * 12/2005 Maurer ...................... 382/262
7,016,549 B1 * 3/2006 Utagawa .................... 382/261

FOREIGN PATENT DOCUMENTS

| JP | 1-128170 | 5/1989 |
| JP | 6-86104 | 3/1994 |
| JP | 9-83804 | 3/1997 |
| JP | 11-17954 | 1/1999 |
| JP | 2001-5958 | 1/2001 |

OTHER PUBLICATIONS

Watabe H et al: "Nonlinear filters for multimedia applications" Image Processing, 1999. ICIP 99. Proceedings. 1999 International Conference on Kobe, Japan Oct. 24-28, 1999, Piscataway, NJ, USA, IEEE, US, Oct. 24, 1999, pp. 174-178, XP010368911.

* cited by examiner

RELATED ART

RELATED ART

IMAGE NOISE REDUCTION METHOD AND DEVICE

TECHNICAL FIELD

The present invention relates to an image noise reduction method and apparatus for being preferably used to process, for example, an image signal by digitizing it. Particularly, the present invention relates to an image noise reduction method and apparatus for solving a trouble when reducing noise components of an image signal by using the so-called ε-filter.

BACKGROUND ART

For example, to reduce noise components included in an image signal, various methods have been proposed so far. Particularly, one of the simplest methods having a large noise reduction effect is a method using a low-pass filter (hereafter referred to as LPF). The LPF is a device for transmitting only signals having components lower than a reference frequency. That is, by inputting a signal whose frequencies change to the LPF and observing the amplitude of an output signal, a characteristic is obtained that a component at a higher frequency lowers in level.

However, when viewed from a different point, the LPF uses the average value of a watched pixel and adjacent pixels around the watched pixel as a new value of the watched pixel. That is, in the case of this method, signal levels of watched pixels strongly correlated with peripheral pixels are not greatly changed in their values even if the levels are averaged. However, random noise components having no correlation are averaged with noise components included in peripheral pixels and thereby, the value of the component is approached to "0".

Therefore, when using the above LPF, the noise suppression effect increases as the search area of peripheral pixels is widened. However, in the case of the averaging operation with peripheral pixels by the LPF, image edge information is reduced similarly to noises and resultantly, the whole image becomes blurry though noises are decreased and a disadvantage occurs that the image quality is deteriorated. Therefore, an LPF serving as noise reduction means is not generally used.

To solve the disadvantage of the LPF, the so-called ε-filter is disclosed (refer to Journal of Institute of Electronics, Information, and Communication Engineers Vol. 77 No. 8, pp. 844–852, April, 1994, Kaoru Arakawa "Nonlinear Digital Filter and Its Application"). That is, in the case of the ε-filter disclosed in this document, when averaging a watched pixel and peripheral pixels, it is first determined whether the peripheral pixels has a correlation with the watched pixel.

Specifically, by setting a certain reference level θ, levels of the peripheral pixels are incorporated into averaging factors when the levels are included in the range of ±θ of the level of the watched pixel but they are not incorporated into averaging factors if they are not included in the range of ±θ. Thus, whether to incorporate all peripheral factors into averaging factors is searched and a new value of the watched pixel is obtained by the averaging operations with the watched pixel and the peripheral pixels which are regarded as operation objects.

Therefore, even if an image edge enters a search area, when the levels of pixels constituting the edge exceeds the range of ±θ of the level of the watched pixel, the edge is not regarded as an operation object, for example, it never happens that an image becomes blurry due to pixels constituting the edge being included in averaging. That is, with the ε-filter, it is possible to suppress only noise components while leaving an image edge as it is by properly selecting the value of he reference level θ.

Moreover, an actual circuit configuration of the ε-filter is described below by using FIG. 5. In FIG. 5, the diagram 1 shows a certain one point in an image area and imaged states of a watched pixel o and its peripheral pixels a, b, c, d, e, f, g, and h. Moreover, when substituting level values of these pixels with the same notation as a to h and o, the level values a to h of these peripheral pixels are supplied to a selection circuit 2. Moreover, the value of the above reference level θ and the level value o of the watched pixel are input to the selection circuit 2.

In the selection circuit 2, the absolute value (|a−o|) of the difference between the level value a of the peripheral pixel a and the level value o of the watched pixel o is first calculated and the absolute value of the difference is compared with the reference level θ. Then, when the absolute value of the above difference is smaller than the value of the reference level θ, the level value a is output to an output port 3. Moreover, when the absolute value of the difference is larger than the value of the reference level θ, the level value a is not output to the output port 3 but the value "0" is output. Furthermore, the same calculations are applied to level values b to h of other peripheral pixels b to h.

Therefore, eight output ports 3 equal to the number of peripheral pixels, for example, are provided for the selection circuit 2, and the level values a to h are output to the output ports 3 when the absolute value of the above difference is smaller than the value of the reference level θ and the value "0" is output to the ports 3 when the absolute value of the difference is larger than the value of the reference level θ. Moreover, an output port 4 is provided for the selection circuit 2 and a value obtained by adding "1" to the number of the output ports 3 to which the above level values a to h are output is output to the output port 4.

That is, level values a to h are output from the output ports 3 of the selection circuit 2 when absolute values differences between a watched pixel and peripheral pixels are all smaller than the value of the reference level θ and the value "9" is output to the output port 4. Moreover, when absolute values of differences between the watched pixel and peripheral pixels are all larger than the value of the reference level θ, the value "0" is output from all output ports 3 and the value "1" is output from the output port 4.

Outputs of the output ports 3 of the selection circuit 2 and the level value o of the watched pixel o are supplied to an adder 5 and a value selected by the output port 6 of the adder 5 is supplied to a divider 7. Moreover, a value outputted from the output port 4 of the selection circuit is supplied to the divider 7. Then, in the divider 7, a value outputted from the output port 6 of the adder 5 is divided by a value outputted from the output port 4 of the selection circuit 2 and the value of the above operation result is output by an output port 8.

A certain reference level θ is set, and levels of the peripheral pixels are incorporated into averaging factors when the levels are included in the range of ±θ of the level of a watched pixel but the levels are not incorporated into averaging factors when they are not included in the range and then, whether to incorporate all peripheral pixels into averaging factors is searched and only peripheral pixels to be incorporated as averaging factors are regarded as operation objects and as a result, a new value of a watched pixel obtained through the averaging operation with the watched pixel is output to the output port 8.

A specific circuit configuration of the selection circuit 2 of the above device is similar to the configuration shown in FIG. 6. That is, in FIG. 6, for example, eight comparators 20 equal to the number of the above peripheral pixels are obtained. Level values a to h of the above peripheral pixels, the level value o of the watched pixel, and the value of the reference level θ are input to the comparators 20. Then, each comparator 20 outputs the value "1" when the absolute value of the difference between a peripheral pixel and the watched pixel is smaller than the value of the reference level θ.

Moreover, a signal output from each of the comparators 20 is supplied to an AND gate 21. Furthermore, level values a to h of peripheral pixels are supplied to the AND gate 21 and corresponding one of the level values a to h of peripheral pixels is output to the output ports 3 through the AND gate 21 when a signal output from each of the above comparators 20 is equal to "1". Furthermore, signals output from the comparators 20 are supplied to an adder 22. Furthermore, an addition output of the adder 22 is supplied to an adder 23 and the value "1" is added and output to the output port 4.

Thereby, in the case of this circuit configuration, level values a to h of peripheral pixels are output through the AND gate 21 when absolute values of differences between level values a to h and the level value o of the watched pixel are smaller than the value of the reference level θ. Moreover, the value "0" is output when absolute values of the differences are larger than the value of the reference level θ. Furthermore, a value obtained by adding "1" to the number of level values a to h output to the output ports 3 through the above AND gate 21 is output to the output port 4.

Thus, the selection circuit 2 outputs level values a to h when absolute values of the above differences are smaller than the value of the reference level θ and a value obtained by adding "1" to the number of output level values a to h. Moreover, the level values a to h and the level value o of the watched pixel are added and the addition value is divided by a value obtained by adding "1" to the number of output level values a to h. Thereby, the averaging operation is applied to only pixels regarded as averaging factors and a new value of the watched pixel is derived.

Thus, the above ε-filter makes it possible to effectively reduce noises while preserving image edges. In this case, however, a phenomenon occurs that an area for averaging watched pixels is moved depending on the position of a pixel regarded as an averaging factor and therefore, a signal phase serving as the center of gravity of a pixel is deviated from the position of a watched pixel. For example, when pixels to be incorporated into averaging factors have an offset, an averaged signal phase is brought to the center of those pixels and thereby, it is deviated from the position of a watched pixel.

That is, as shown in FIG. 7A, when pixels to be incorporated into averaging factors are only pixels b, c, e, g, and h, the averaged pixel signal phase is brought to the center (intermediate point between pixels e and o) of six pixels including the pixel o as shown by symbol ● and thereby deviated from the position of the watched pixel o. Moreover, in the case of FIGS. 7B to 7D, averaged pixel signal phases are respectively shown by symbol ● and deviated from the original position of the watched pixel o.

Furthermore, operations become unstable for image edges including an intermediate level shown in FIG. 8A and therefore, the edges may be disordered. That is, a watched pixel is present at the position of the intermediate level, it is induced to any level closest to the watched pixel. However, when absolute values of differences between the intermediate level and levels of pixels before and after an edge are close to a reference level θ, a direction to be induced is reversed due to a slight fluctuation of the intermediate level and edges may be disordered as shown in FIG. 8B.

That is, in FIG. 8A, it is determined that a watched pixel at the position of the intermediate level is close to black, six pixels including three black pixels are averaged as shown in FIG. 7A and the signal phase is moved to right by 0.5 pixels. However, when it is determined that the watched pixel is close to white, six pixels including three white pixels are averaged on the contrary to the above case and the signal phase is moved to left by 0.5 pixels. Thus, the signal phase is moved to right and left due to a slight fluctuation of the intermediate level.

Moreover, when movement of the signal phase to right and left occurs in a string of optional linear pixels, image edges are disordered as shown in FIG. 8B and appear on a screen as noises different from original edges. The above disorder of image edges occurs not only in the illustrated vertical edges but also horizontal or diagonal edges. In any case, they appear on a screen as noises different from the original edge.

DISCLOSURE OF THE INVENTION

The present invention makes it possible to prevent an averaged signal phase from shifting from the position of a watched pixel and cancel the possibility that generated image edges are disordered. Therefore, in the case of the present invention, pixels at point-symmetric positions about a watched pixel are combined, and the averaging operations are performed by using combined pixels only when both pixels are selected. Image noise reduction method and apparatus of the present invention relating to the above mentioned are disclosed.

BEST MODE FOR CARRYING OUT THE INVENTION

Figure 1:
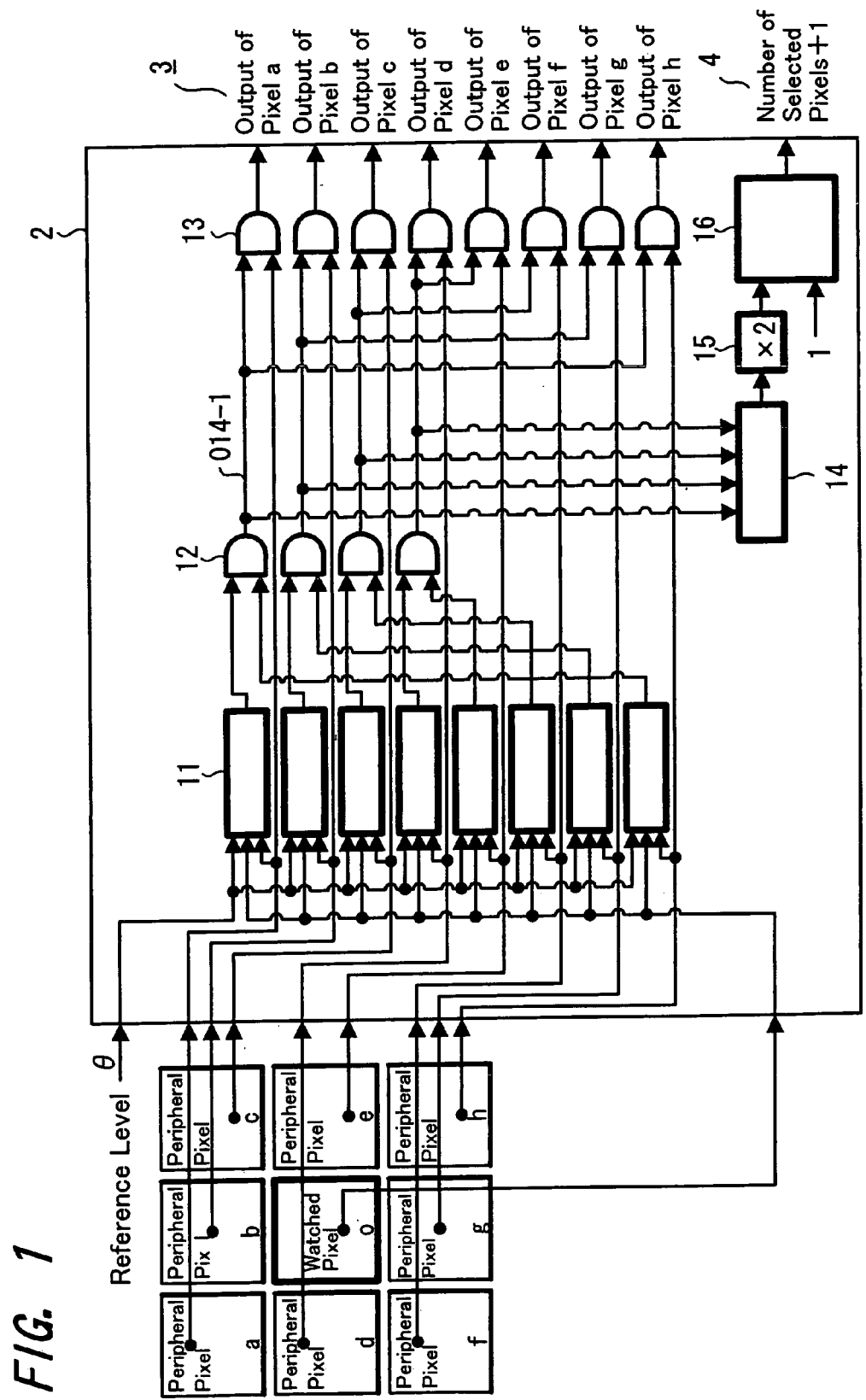
FIG. 1 is a block diagram showing a configuration of an embodiment of a selection circuit used for image noise reduction method and apparatus to which the present invention is applied.
Figure 5:
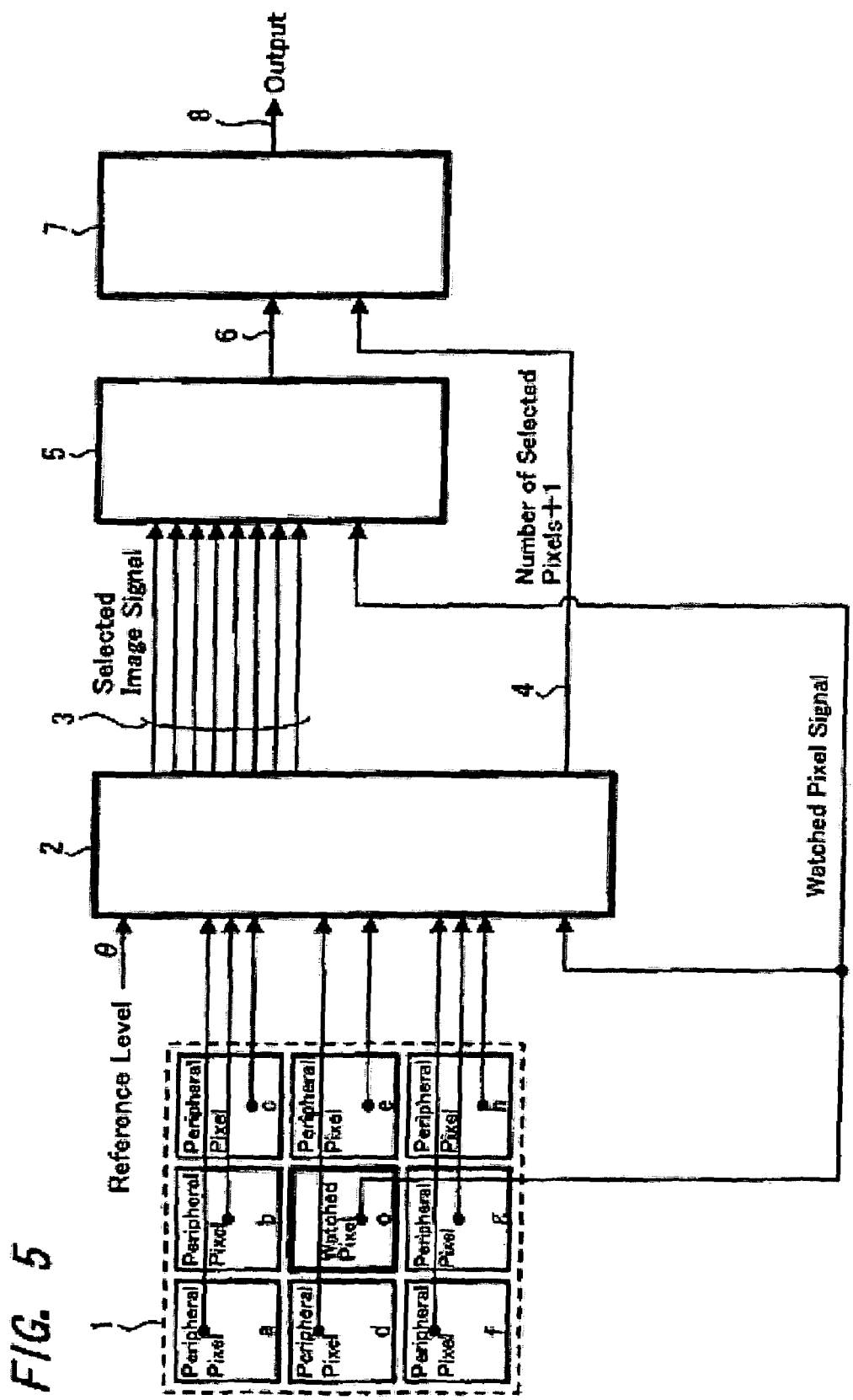
FIG. 5 is a block diagram for explaining a system to which image noise reduction method and apparatus of the present invention are applied.

The present invention is described below by referring to the accompanying drawings. FIG. 1 is a block diagram of a configuration of an embodiment of a selection circuit 2 used for image noise reduction method and apparatus to which the present invention is applied. That is, in the present invention, the whole apparatus configuration is the same as the configuration of the prior art shown in FIG. 5. Moreover, the present invention solves problems of the above-described conventional ∈-filter by improving the selection circuit 2 shown in FIG. 6.

Figure 6:
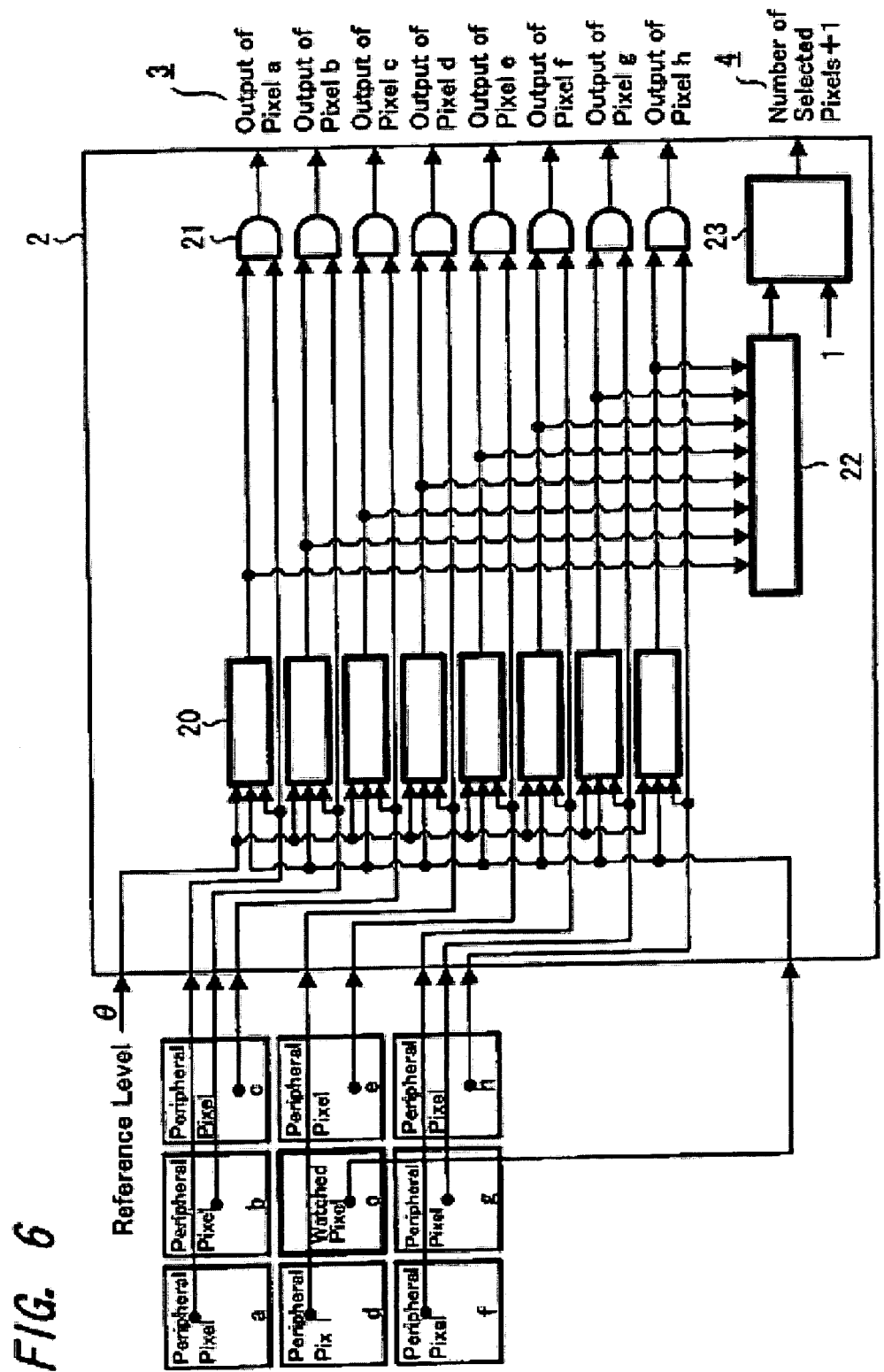
FIG. 6 is a block diagram showing a configuration of a selection circuit used for conventional noise-reduction method and apparatus.
Figure 7A:
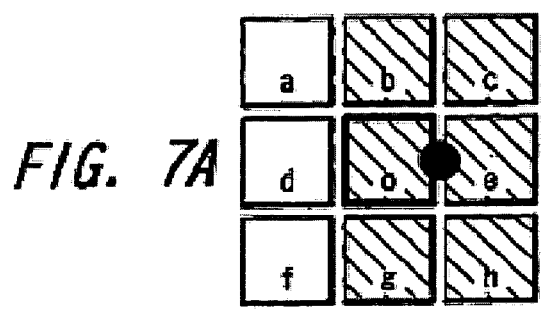
FIG. 7 is illustration for explaining the configuration in FIG. 6.
Figure 7B:
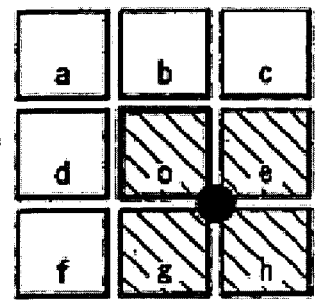
Figure 7C:
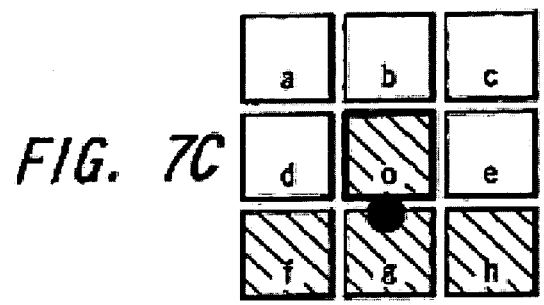
Figure 7D:
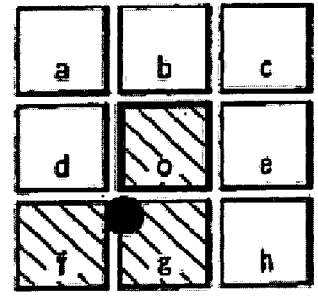

In FIG. 1, for example, eight comparators 11 equal to the number of peripheral pixels are provided the same as the case of FIG. 6 and level values a to h of the above peripheral pixels, the level value o of the watched pixel, and the value of the reference level θ are input to these comparators 11. Moreover, the value "1" is output from each comparator 11 when absolute values of differences between peripheral pixels and a watched pixel are smaller than the value of the reference level θ. This configuration is the same as that of a conventional comparator 20.

Moreover, pixels at point-symmetric positions about the watched pixel o are combined among the above peripheral pixels a to h. That is, peripheral pixels a and h, b and g, c and f, and d and e are respectively combined. Then, signals output from the comparators 11 are supplied to four AND circuits 12. Thereby, the value "1" is output from the AND circuits 12 when both of absolute values of differences between level values of combined pixels and the watched pixel are smaller than the reference level θ.

Moreover, these signals output from the AND circuit 12 are supplied to eight AND gates 13 in accordance with the above combinations. Furthermore, level values a to h of the peripheral pixels are supplied to the AND gates 13 and the level values a to h of corresponding peripheral pixels are output to output ports 3 through the AND gates 13 when signal output from the AND circuit 12 is value "1". The configuration of these AND gates 13 is the same as the configuration of a conventional AND gate 21.

Furthermore, a signal output from the AND circuit 12 is supplied to an adder 14. Furthermore, an addition output of the adder 14 is supplied to a multiplier 15 and doubled. Then, a multiplication output of the multiplier 15 is supplied to an adder 16 and added with the value "1" and output to an output port 4. That is, in this case, because a signal output from the AND circuit 12 represents a signal output from the comparator 11 to two combined peripheral pixels, the signal is set to the original value by doubling it by the multiplier 15.

Thereby, in the case of the above circuit configuration, the level values a to h of the peripheral pixels when absolute values of differences between the level values a to h and the level value o of the watched pixel are all smaller than the value of the reference level θ about the peripheral pixels obtained by combining point-symmetric positions about the watched pixel o are output to the output ports 3 through the AND gates 13. Moreover, a value obtained by adding "1" to the number of the output ports 3 to which the level values a to h are output through the above AND gates 13 is output to the output port 4.

Thus, the selection circuit 2 outputs the level values a to h when absolute values of the above differences are smaller than the value of the reference level θ and a value obtained by adding "1" to the number of the level values a to h which are output. Then, these level values a to h are added with the level value o of the watched pixel and the addition value is divided by a value obtained by adding "1" to the number of the level values a to h which are output and thereby, the averaging operation is applied to only pixels regarded as averaging factors and a new value of the watched pixel is selected.

Then, in this case, the level values a to h of peripheral pixels output from the selection circuit 2 are necessarily combined with pixels at point-symmetric positions about the watched pixel o. Therefore, when the averaging operation is performed the signal phase averaged is not deviated from the original position of the watched pixel but the signal phase always coincides with the position of the watched pixel. Thereby, it is possible to cancel the possibility that image edges are disordered in FIG. 8 described for Prior Art.

Figure 8A:
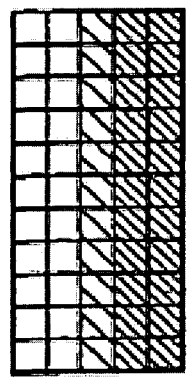
FIG. 8 is illustration for explaining the configuration in FIG. 6.
Figure 8B:
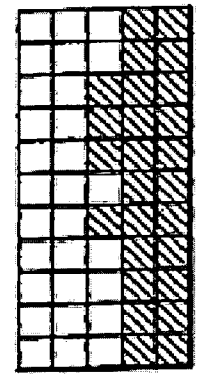

That is, for example, in the case of the image edges in FIG. 8A, even if it is determined that the watched pixel at the position of the intermediate level is close to white or black, only one of point-symmetric pixels is not incorporated into averaging factors but in this case, only upper and lower intermediate-level peripheral pixels are incorporated into averaging factors. Therefore, a signal phase is not moved to right and left due to a slight fluctuation of an intermediate level, image edges in FIG. 8A are directly output, and the disorder of the image edges in FIG. 8A is canceled.

Figure 2:
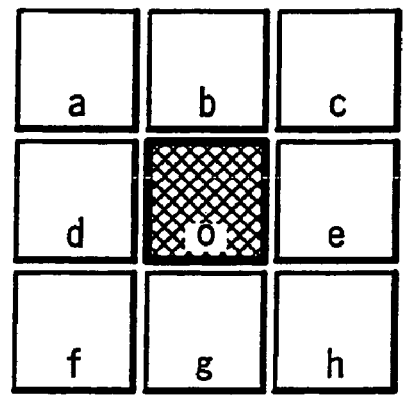
FIG. 2 is an illustration for explaining operations of the embodiment in FIG. 1.

According to the present invention, when only one point of the watched pixel o shown in FIG. 2 fluctuates in levels, the level value of the watched pixel o is averaged when absolute values of differences between the level value o of the watched pixel and level values a to h of peripheral pixels are smaller than the value of the reference level θ and noises are reduced. Moreover, when absolute values of differences between the level value o of the watched pixel and level values a to h of peripheral pixels are larger than the value of the reference level θ, the level values are preserved as correct level values.

Therefore, in the case of the above embodiment, by combining pixels at point-symmetric positions about a watched pixel and using only pixels which are both selected and thereby performing the averaging operation, an averaged signal phase is not deviated from the original position of the watched pixel and moreover, the possibility that generated image edges are disordered can be canceled.

Thereby, in the case of a conventional apparatus, if a pixel to be incorporated into averaging factors has an offset, a signal phase is deviated from the original position of a watched pixel and thereby, problems of disorder of image edges and the like cannot be canceled. However, the present invention makes it possible to easily cancel these problems.

Moreover, according to the present invention, there is no possibility that an offset occurs in a pixel to be incorporated into averaging factors, and thereby there is no possibility of the problem that an averaged signal phase is deviated from the original position of a watched pixel. Therefore, it is possible to widen the range for searching peripheral pixels. That is, in the case of the above embodiment, 3×3 pixels are searched. However, it is also possible to search 5×5 pixels or more pixels as shown in FIG. 3.

Figure 3:
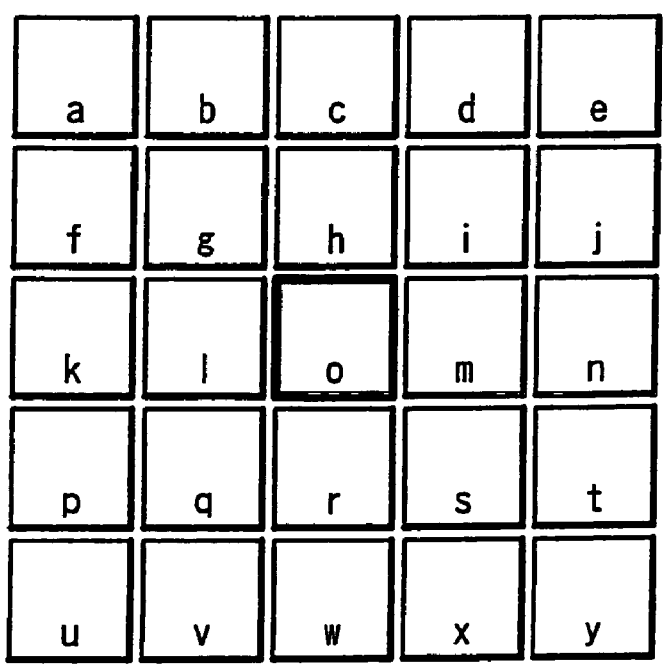
FIG. 3 is an illustration for explaining another embodiment of the present invention.
Figure 4:
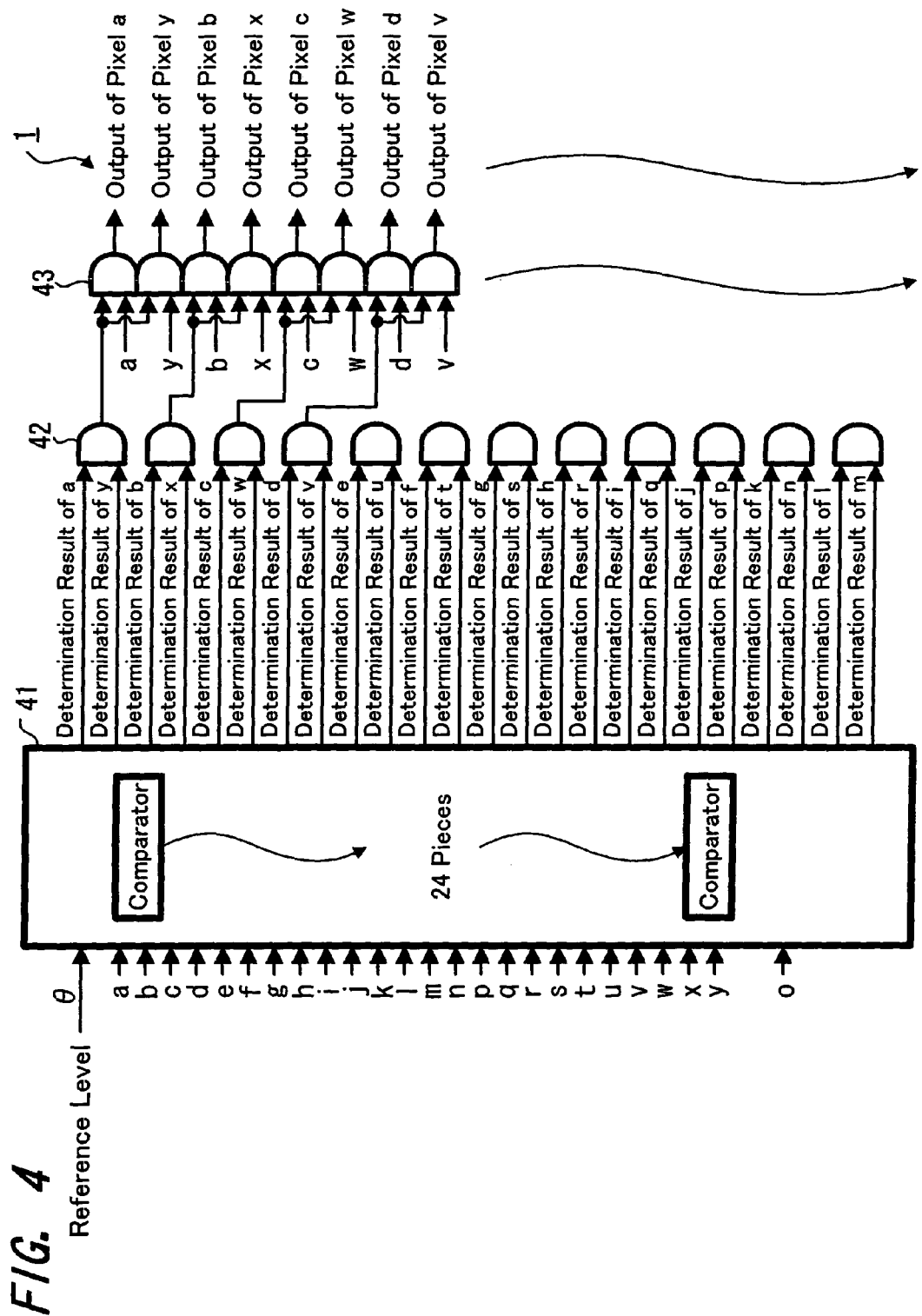
FIG. 4 is a block diagram showing a configuration of another embodiment of a selection circuit used for image noise reduction method and apparatus to which the present invention is applied.

Therefore, to search 5×5 pixels as shown in FIG. 3, the level value o of a watched pixel, level values a to y (excluding o) of peripheral pixels, and the value of the reference level θ are input to 24 comparators 41 of the selection circuit 2 shown in FIG. 4. Then, the value "1" is output from each comparator 41 when absolute values of differences between the levels of the peripheral pixels and the watched pixel are smaller than the value of the reference level θ. The above configuration is obtained by enlarging the configuration same as that of the conventional comparator 20.

Moreover, the above pixels a to y (excluding o) at point-symmetric positions about the watched pixel o are combined. That is, peripheral pixels a and y, b and x, c and w, . . . are respectively combined. Then, signals output from the comparator 41 are supplied to twelve AND circuits 42. Thereby, the AND circuits 42 output the value "1" when absolute values of differences between level values of the combined pixels and the watched pixel are smaller than the value of the reference level θ.

Then, signals output from the AND circuits 42 are supplied to twenty-four AND gates 43 in accordance with the above combinations. Moreover, level values a to y (excluding o) of the peripheral pixels are respectively supplied to the AND gates 43 and when signals output from the above AND circuits 42 respectively have the value "1", level values a to y (excluding o) of corresponding peripheral pixels are output to the output ports 3 through the AND gates 43. The configuration of these AND gates 43 is obtained by enlarging the configuration same as that of the conventional AND gate 21.

Moreover, though not illustrated, signals output from the AND circuits 42 are supplied to an adder and the addition output is doubled by a multiplier. Then, the multiplication output of the multiplier is supplied to an adder, added with the value "1", and output to the output port 4. That is, in this case, because the signals output from the AND circuits 42 represent signals output from the comparator 41 to two peripheral pixels respectively combined, the former signals are set to original values by doubling the signals by a multiplier.

Thus, the selection circuit 2 outputs the level values a to y (excluding o) when the above absolute values of differences are smaller than the value of the reference level θ and a value obtained by adding "1" to the number of the level values being output. Then, these level values and the level value o of the watched pixel are added and divided by the value obtained by adding "1" to the number of level values which are output and thereby, the averaging operation only for pixels regarded as averaging factors is performed and a new value of the watched pixel is selected.

Thus, also in the case of this embodiment, the averaging operations are performed by using only pixels in which pixels at point-symmetric positions about a watched pixel are combined and both are selected. Therefore, an averaged signal phase is not deviated from the original position of the watched pixel and it is also possible to cancel the possibility of disorder of generated image edges or the like. The above configuration can correspond to a case of searching 7×7 pixels or more by only enlarging a circuit.

That is, when the noise suppression effect of an ε-filter is maximally shown, the averaging operation is applied to a flat image, that is, all pixels a to h in FIG. 2. When the number of averaging factors is decreased as shown in FIG. 7, the noise suppression effect is also decreased. Therefore, in the case of this image, even if operations of an ε-filter are turned off, the influence degree on the image is small.

Therefore, in the case of the present invention, processing is performed resulting to reduce averaging factors. However, when the above image edges enter an area, the effect by averaging is originally decreased. Therefore, deterioration of an image is not accelerated by the present invention while it is possible to preserve edges in natural forms and maximally show the noise suppression effect in the case of a flat image.

Thus, the above image noise reduction method is an image noise reduction method for reducing noise components by detecting level differences between a watched pixel and its peripheral pixels and selecting only pixels whose level differences are smaller than a reference value to apply the averaging operation, in which the averaging operations are performed by using only pixels in which pixels at point-symmetrical positions about a watched pixel are combined and both are selected. So, an averaged signal phase is not deviated from the original position of the watched pixel and the possibility of disorder of image edges can be canceled.

Moreover, the above image noise reduction apparatus is an image noise reduction apparatus for reducing noise component, comprising detection means for detecting level differences between a watched pixel and its peripheral pixels, selection means for selecting only pixels whose level differences are smaller than a reference value, and operation means for performing the averaging operation by using the selected pixels, characterized in that an averaged signal phase is not deviated from the original position of the watched pixel and the possibility of disorder of image edges or the like can be canceled by using means for combining pixels at point-symmetric positions about the watched pixel and selecting only pixels in which the combined pixels are both selected and thereby performing the averaging operation by both the operation means.

The present invention is not restricted to the above-described embodiment but various modifications are allowed as long as they are not deviated from the spirit of the present invention.

That is, according to the present invention, the averaging operation is performed by using only pixels in which pixels at point-symmetric positions about a watched pixel are combined and both selected. Therefore, an averaged signal phase is not deviated from the original position of the watched pixel and the possibility of disorder of image edges can be canceled.

Moreover, according to the present invention, it is possible to further widen the search range of peripheral pixels by setting the range of peripheral pixels to a range of 3×3.

Furthermore, according to the present invention, it is possible to further widen the search range of peripheral pixels by setting the range of peripheral pixels to a range of 5×5.

Furthermore, according to the present invention, it is possible to further widen the search range of peripheral pixels by setting the range of peripheral pixels to a range exceeding 5×5.

Furthermore, according to the present invention, it is possible to perform very preferable processing by digitizing and processing each pixel level.

Furthermore, according to the present invention, an averaged signal phase is not deviated from the original position of a watched pixel and the possibility of disorder of generated image edges can be canceled by using only pixels in which pixels at point-symmetric positions about the watched pixel are combined and both are selected.

Furthermore, according to the present invention, it is possible to further widen the search range of peripheral pixels by setting the range of peripheral pixels to a range of 3×3, 5×5, or more.

Furthermore, according to the present invention, it is possible to further widen the search range of peripheral pixels by setting the range of peripheral pixels to a range of 3×3.

Furthermore, according to the present invention, it is possible to further widen the search range of peripheral pixels by setting the range of peripheral pixels to a range of 5×5.

Furthermore, according to the present invention, it is possible to further widen the search range of peripheral pixels by setting the range of peripheral pixels to a range exceeding 5×5.

Furthermore, according to the present invention, it is possible to perform very preferable processing by digitizing and processing each pixel level.

Thereby, in the case of a conventional apparatus, when a pixel to be incorporated into averaging factors has an offset in the so-called ε-filter, an averaged signal phase may be deviated from the original position of a watched pixel and thereby, it is impossible to solve the problem of disorder of image edges. However, according to the present invention, it is possible to easily solve the problems.

The invention claimed is:

1. An image noise reduction method, comprising:
   reducing noises by detecting level differences between a watched pixel and its peripheral pixels;
   selecting only pixels with level differences of which are smaller than a reference value to perform averaging operations, wherein
      pixels at point-symmetry positions about the watched pixel are combined and said averaging operations are performed using only said combined pixels which are both selected pixels; and
   performing said averaging operation where an average signal phase is similar to an original position of the watched pixel and coincides with the position of the watched pixel.

2. An image noise reduction method according to claim 1, wherein
   the range of the peripheral pixels is set to a range of 3×3.

3. An image noise reduction method according to claim 1, wherein
   the range of the peripheral pixels is set to a range of 5×5.

4. An image noise reduction method according to claim 1, wherein
   the range of the peripheral pixels is set to a range exceeding 5×5.

5. An image noise reduction method according to claim 1, wherein
   the level of each of the pixels is digitized and processed.

6. An image noise reduction apparatus for reducing noise components, comprising:
   detection means for detecting level differences between a watched pixel and its peripheral pixels;
   selection means for selecting only pixels the level differences of which are smaller than a reference value; and
   operation means for performing averaging operations by using the selected pixels, wherein
      pixels at point-symmetry positions about a watched pixel are combined, and means is provided for deriving only combined pixels which are both selected pixels,
      said averaging operations by said operation means are performed by using only said derived pixels, and
      an average signal phase averaged is similar to an original position of the watched pixel and coincides with the position of the watched pixel.

7. The image noise reduction apparatus according to claim 6, wherein
   the range of the peripheral pixels is set to a range of 3×3.

8. The image noise reduction apparatus according to claim 6, wherein
   the range of the peripheral pixels is set to a range of 5×5.

9. The image noise reduction apparatus according to claim 6, wherein
   the range of the peripheral pixels is set to a range exceeding 5×5.

10. The image noise reduction apparatus according to claim 6, wherein
   the level of each of the pixels is digitized and processed.

* * * * *